2,817,694
RUBBER VULCANIZATION PROCESS

Kenneth E. Creed, Jr., Nitro, and John J. D'Amico, Charleston, W. Va., assignors to Monsanto Chemical Company, St. Louis, Mo., a corporation of Delaware No Drawing. Application September 17, 1953
Serial No. 380,886

8 Claims. (Cl. 260—787)

This invention relates to the vulcanization of rubber. More particularly this invention relates to the vulcanization of sulfur-vulcanizable rubbers employing as vulcanization accelerators therefor a mixture of a vulcanization accelerator and a 2-mercapto-4-alkyl-thiazole-5-carboxylic acid or its salts and to the vulcanized product obtained thereby.

In accordance with this invention it has been found that 2-mercapto-4-alkyl-thiazole-5-carboxylic acids of the structural formula

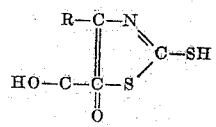

where R is an alkyl radical such as methyl, ethyl, propyl, butyl, amyl, etc., and its salts when employed in conjunction with a vulcanization accelerator, particularly a sulfur-containing primary organic vulcanization accelerator, provide for a substantial improvement in processing safety in the compounding of sulfur-vulcanizable rubbers. Additionally the new vulcanization accelerator adjuvants provide for a more efficient and more economical use of sulfur-containing primary organic vulcanization accelerators in the compounding of sulfur-vulcanizable rubbers reinforced with furnace carbon blacks such as the high abrasion (HAF) and super abrasion (SAF) furnace blacks.

The new vulcanization accelerator adjuvants of this invention may be prepared by a variety of well-known methods, as for example by hydrolyzing a 4-alkyl-5-carbomethoxy-2-thiazolethiol, the latter being prepared by reacting an ester of the formula

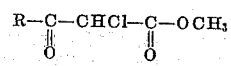

where R is an alkyl radical with ammonium dithiocarbamate in substantially equimolecular proportions in an aqueous medium.

A specific illustration of the preparation of the new vulcanization accelerator adjuvants is as follows:

EXAMPLE 1

Substantially one molecular proportion of methyl α-chloroacetoacetate and substantially one molecular proportion of ammonium dithiocarbamate are intimately mixed in the presence of substantially 55 molecular proportions of water. The reaction is immediate and exothermic and a precipitate forms. The reaction mass is agitated for about 8 hours and is then allowed to stand to permit settling of the precipitate. The precipitate is filtered off, washed with water until the washings are neutral to litmus. The crude solid, substantially 0.73 molecular proportion of 4-methyl-5-carbomethoxy-2-thiazolethiol, is then admixed with substantially 1.46 molecular proportions of sodium hydroxide in the form of a 25% by weight aqueous solution. Substantially 45 molecular proportions of water is then added and with constant agitation the mix is agitated for about 2 hours at about 60–70° C. The mass is cooled to about 15° C. and acidified with concentrated hydrochloric acid. The precipitate is filtered off, washed with water and dried. The light yellow solid so obtained is 2-mercapto-4-methyl-thiazole-5-carboxylic acid.

The salts contemplated by this invention are readily prepared from the free mercaptan and as illustrative thereof is the following:

EXAMPLE 2

Substantially 25 parts by weight of 2-mercapto-4-methyl-thiazole-5-carboxylic acid is admixed with substantially 11.44 parts by weight of a 10% aqueous solution of sodium hydroxide and substantially 500 parts by weight of water. To the agitating mass is added a solution containing substantially 36.7 parts by weight of cadmium sulfate dissolved in substantially 900 parts by weight of water. The mass is then agitated for about 1 hour. The resultant precipitate is then filtered off, washed with water and dried. The product is the cadmium salt of 2-mercapto-4-methyl-thiazole-5-carboxylic acid.

Similarly but replacing cadmium sulfate with an equimolecular amount of zinc chloride, the zinc salt of 2-mercapto-4-methyl-thiazole-5-carboxylic acid is obtained.

As illustrative of the properties of the new vulcanization accelerator adjuvants of this invention the following stocks were compounded comprising

| Stock | A | B | C |
|---|---|---|---|
| | Parts by weight | | |
| Smoked sheets rubber | 100 | 100 | 100 |
| Furnace carbon black | 50 | 50 | 50 |
| Zinc oxide | 5.0 | 5.0 | 5.0 |
| Stearic acid | 2.0 | 2.0 | 2.0 |
| Saturated hydrocarbon softener | 3.0 | 3.0 | 3.0 |
| Sulfur | 2.5 | 2.5 | 2.5 |
| 2-Mercaptobenzothiazole | 0.8 | | 0.2 |
| 2-Mercapto-4-methyl-thiazole-5-carboxylic acid | | 0.8 | 0.6 |

The above stocks so compounded were cured in the usual manner by heating in a press for different periods of time at 144° C. The physical properties of the respective cured stocks are set forth below:

Table I

| Stock | Time of Cure in Mins. | Modulus of Elasticity in lbs./in.$^2$ at Elongation of 300% | Tensile at Break in lbs./in.$^2$ | Ultimate Elongation, percent |
|---|---|---|---|---|
| A | 30 | 2,063 | 3,486 | 463 |
| B | 30 | 1,056 | 2,096 | 473 |
| C | 30 | 1,683 | 3,060 | 470 |
| A | 60 | 1,965 | 3,230 | 435 |
| B | 60 | 1,295 | 2,310 | 450 |
| C | 60 | 1,745 | 2,915 | 450 |

The scorch times as determined by the Mooney plastometer at 121° C. were found to be as follows:

Table II

Stock:                           Scorch time in minutes
A ---------------------------------------- 8
B ---------------------------------------- 30
C ---------------------------------------- 17

As further illustrative of the properties of the new vulcanization accelerator adjuvants of this invention, a base rubber stock was compounded comprising:

| | Parts by weight |
|---|---|
| Smoked sheets rubber | 100.0 |
| Furnace carbon black | 50.0 |
| Zinc oxide | 5.0 |
| Stearic acid | 2.0 |
| Saturated hydrocarbon softener | 3.0 |
| Sulfur | 2.5 |

Employing the above base stock the following composites of new vulcanization accelerator adjuvant and vulcanization accelerator were separately incorporated and compared to a stock vulcanized in the presence of the new vulcanization accelerator adjuvant alone:

| Stock | Parts by Weight | Additive |
|---|---|---|
| D | 0.8 | 2-Mercapto-4-methyl-thiazole-5-carboxylic acid. |
| E | 0.6 | Do. |
|   | 0.2 | 1,2-Bis(2-benzothiazolylmercaptomethyl)urea. |
| F | 0.5 | 2-Mercapto-4-methyl-thiazole-5-carboxylic acid. |
|   | 0.3 | 1,2-Bis(2-benzothiazolylmercaptomethyl)urea. |
| G | 0.3 | 2-Mercapto-4-methyl-thiazole-5-carboxylic acid. |
|   | 0.2 | 1,2-Bis(2-benzothiazolylmercaptomethyl)urea. |
| H | 0.5 | 2-Mercapto-4-methyl-thiazole-5-carboxylic acid. |
|   | 0.2 | 1,2-Bis(2-benzothiazolylmercaptomethyl)urea. |
|   | 0.1 | Tetramethyl thiuram monosulfide. |
| I | 0.4 | 2-Mercapto-4-methyl-thiazole-5-carboxylic acid. |
|   | 0.1 | 1,2-Bis(2-benzothiazolylmercaptomethyl)urea. |
|   | 0.05 | Tetramethyl thiuram monosulfide. |
| K | 0.7 | 2-Mercapto-4-methyl-thiazole-5-carboxylic acid. |
|   | 0.1 | Tetramethyl thiuram monosulfide. |
| L | 0.4 | 2-Mercapto-4-methyl-thiazole-5-carboxylic acid. |
|   | 0.1 | Tetramethyl thiuram monosulfide. |
| M | 0.2 | 2-Mercapto-4-methyl-thiazole-5-carboxylic acid. |
|   | 0.6 | 2-Mercapto-N-cyclohexyl-benzothiazolesulfenamide. |
| N | 0.1 | 2-Mercapto-4-methyl-thiazole-5-carboxylic acid. |
|   | 0.4 | 2-Mercapto-N-cyclohexyl-benzothiazolesulfenamide. |
| O | 0.2 | 2-Mercapto-4-methyl-thiazole-5-carboxylic acid. |
|   | 0.3 | 2-Mercapto-N-cyclohexyl-benzothiazolesulfenamide. |

The above stocks so compounded were cured in the usual manner by heating in a press for different periods of time at 144° C. The physical properties of the respective cured stocks are set forth below:

Table III

| Stock | Time of Cure in Minutes | Modulus of Elasticity in lbs./in.² at Elongation of 300% | Tensile at Break in lbs./in.² | Ultimate Elongation, percent |
|---|---|---|---|---|
| D | 30 | 1,180 | 2,503 | 506 |
| E | 30 | 1,720 | 2,985 | 450 |
| F | 30 | 1,815 | 3,210 | 475 |
| G | 30 | 1,785 | 2,940 | 465 |
| H | 30 | 2,370 | 3,535 | 425 |
| I | 30 | 1,936 | 3,266 | 450 |
| K | 30 | 2,146 | 3,140 | 413 |
| L | 30 | 2,083 | 3,330 | 436 |
| M | 30 | 2,863 | 4,173 | 450 |
| N | 30 | 2,560 | 4,123 | 466 |
| O | 30 | 2,326 | 3,846 | 466 |
| D | 60 | 1,460 | 2,355 | 420 |
| E | 60 | 1,920 | 2,813 | 400 |
| F | 60 | 2,140 | 3,063 | 400 |
| G | 60 | 1,785 | 2,670 | 410 |
| H | 60 | 2,386 | 3,603 | 423 |
| I | 60 | 1,915 | 2,870 | 420 |
| K | 60 | 2,025 | 2,935 | 410 |
| L | 60 | 2,050 | 3,095 | 400 |
| M | 60 | 2,800 | 4,000 | 426 |
| N | 60 | 2,426 | 3,796 | 443 |
| O | 60 | 2,295 | 3,490 | 435 |
| D | 90 | 1,563 | 2,413 | 416 |
| E | 90 | 2,005 | 2,905 | 410 |
| F | 90 | 2,146 | 2,946 | 400 |
| G | 90 | 1,933 | 2,956 | 416 |
| H | 90 | 2,425 | 3,640 | 430 |
| I | 90 | 1,943 | 3,003 | 406 |
| K | 90 | 2,076 | 2,976 | 396 |
| L | 90 | 2,090 | 2,936 | 403 |
| M | 90 | 2,680 | 3,830 | 416 |
| N | 90 | 2,405 | 3,650 | 450 |
| O | 90 | 2,270 | 3,733 | 456 |

The scorch times as determined by the Mooney plastometer at 121° C. were found to be as follows:

Table IV

| Stock: | Scorch time in minutes |
|---|---|
| D | 27 |
| E | 21 |
| F | 20 |
| G | 20 |
| H | 12 |
| I | 16 |
| K | 14 |
| L | 13 |
| M | 12 |
| N | 14 |
| O | 13 |

As will be obvious to those skilled in the art upon perusing the foregoing data this invention provides for substantial improvements in the compounding of sulfur-vulcanizable rubbers. Other vulcanization accelerators may be employed than the afore-described such as 2-mercapto-N-ethyl- and 2-mercapto-N-isopropyl-benzothiazolesulfenamide, 2-mercapto-N-morpholinyl- and 2-mercapto-N-piperidyl-benzothiazolesulfenamide, 2-mercapto-N-ethyl-4,5-dimethyl-thiazolesulfenamide, and like thiazolesulfenamide accelerators. Additionally such thiuram sulfides as tetramethyl thiuram disulfide as well as the tetraethyl-, tetrapropyl- and tetrabutyl thiuram mono- and di-sulfides, etc. and also the 1,2-bis(thiazolylmercaptomethyl)urea vulcanization accelerators, particularly the reaction products of mercaptoarylenethiazoles with methylol carbamides and methylol thiocarbamides as described and disclosed by Robert L. Sibley in U. S. Patent 2,145,808 may be employed in conjunction with the new vulcanization accelerator adjuvants of this invention.

As further illustrative of this invention the following stocks were compounded comprising

| Stock | P | Q | R | S | T |
|---|---|---|---|---|---|
| | Parts by weight | | | | |
| Smoked sheets rubber | 100 | 100 | 100 | 100 | 100 |
| Furnace carbon black | 50 | 50 | 50 | 50 | 50 |
| Stearic acid | 2.0 | 2.0 | 2.0 | 2.0 | 2.0 |
| Zinc oxide | 5.0 | 5.0 | 5.0 | 5.0 | 5.0 |
| Saturated hydrocarbon softener | 3.0 | 3.0 | 3.0 | 3.0 | 3.0 |
| Sulfur | 2.5 | 2.5 | 2.5 | 2.5 | 2.5 |
| 2-Mercapto-4-methyl-thiazole 5-carboxylic acid | 0.8 | 0.6 | 0.6 | 0.6 | 0.8 |
| Diphenyl guanidine | | 0.2 | | | |
| Butyraldehyde-aniline condensation product | | | 0.2 | | |
| Tetramethyl thiuram disulfide | | | | 0.2 | |
| Lead oxide | | | | | 1.5 |

The above stocks so compounded were cured in the usual manner by heating in a press for different periods of time at 144° C. The physical properties of the respective cured stocks are set forth below:

Table V

| Stock | Time of Cure in Minutes | Modulus of Elasticity in lbs./in.² at Elongation of 300% | Tensile at Break in lbs./in.² | Ultimate Elongation, Percent |
|---|---|---|---|---|
| P | 30 | 1,056 | 2,096 | 473 |
| Q | 30 | 1,650 | 2,843 | 443 |
| R | 30 | 1,525 | 2,815 | 460 |
| S | 30 | 2,315 | 3,460 | 425 |
| T | 30 | 2,020 | 3,470 | 473 |
| P | 60 | 1,295 | 2,310 | 450 |
| Q | 60 | 1,806 | 2,773 | 413 |
| R | 60 | 1,825 | 2,750 | 420 |
| S | 60 | 2,140 | 3,266 | 422 |
| T | 60 | 2,150 | 3,010 | 400 |
| P | 90 | 1,416 | 2,396 | 430 |
| Q | 90 | 1,980 | 2,990 | 435 |
| R | 90 | 1,770 | 2,660 | 403 |
| S | 90 | 2,080 | 3,380 | 430 |
| T | 90 | 2,093 | 2,956 | 403 |

The scorch times as determined by the Mooney Plastometer at 121° C. were found to be as follows:

Table VI

| Stock: | Scorch time in minutes |
|---|---|
| P | 30 |
| Q | 18 |
| R | 17 |
| S | 11 |
| T | 9 |

As further illustrative of the properties of the new vulcanization accelerator adjuvants of this invention the following butyl rubber stocks were compounded comprising

| Stock | U | V |
|---|---|---|
| | Parts by weight | |
| Butyl rubber | 100 | 100 |
| Carbon black | 54 | 54 |
| Zinc oxide | 5.0 | 5.0 |
| Stearic acid | 1.0 | 1.0 |
| Sulfur | 1.5 | 1.5 |
| p-Quinonedioxime | 2.0 | 2.0 |
| Cadmium salt of 2-mercapto-4-methyl-thiazole-5-carboxylic acid | 4.0 | |
| Zinc salt of 2-mercapto-4-methyl-thiazole-5-carboxylic acid | | 4.0 |

The above stocks so compounded were cured in the usual manner by heating in a press for different periods of time at 330° F. The physical properties of the respective cured stocks are set forth below:

Table VII

| Stock | Time of Cure in Mins. | Modulus of Elasticity in lbs./in.² at Elongations of— | | Tensile At break, lbs./in.² | Ultimate Elongation, Percent | Shore "A" Hardness |
|---|---|---|---|---|---|---|
| | | 300% | 500% | | | |
| U | 15 | 545 | 1,100 | 1,220 | 550 | 55 |
| V | 15 | 485 | 955 | 1,100 | 620 | 55 |
| U | 30 | 940 | 1,705 | 1,735 | 510 | 60 |
| V | 30 | 830 | 1,570 | 1,570 | 500 | 60 |
| U | 60 | 1,385 | | 1,895 | 450 | 60 |
| V | 60 | 1,395 | | 1,835 | 430 | 60 |

The scorch time as determined by the Mooney Plastometer employing the large rotor at 135° C. was found to be in excess of 30 minutes for the respective stocks.

As further illustrative of the properties of the new vulcanization accelerator adjuvants of this invention, the following gum stocks were compounded comprising

| Stock | W | X |
|---|---|---|
| | Parts by weight | |
| Smoked sheets rubber | 100 | 100 |
| Zinc oxide | 5 | 5 |
| Stearic acid | 1 | 1 |
| Sulfur | 3 | 3 |
| Diphenyl guanidine | | 0.3 |
| 2-Mercapto-4-methyl-thiazole-5-carboxylic acid | 1.0 | 0.7 |

The above stocks so compounded were cured in the usual manner by heating in a press for different periods of time at 135° C. The physical properties of the respective cured stocks are set forth below:

Table VIII

| Stock | Time of Cure in Minutes | Modulus of Elasticity in lbs./in.² at Elongations of— | | | Tensile at Break in lbs./in.² | Ultimate Elongation, Percent |
|---|---|---|---|---|---|---|
| | | 300% | 500% | 700% | | |
| W | 45 | | no cure | | | |
| X | 45 | 110 | 230 | | 816 | 2,256 | 900 |
| W | 60 | | no cure | | | |
| X | 60 | 130 | 320 | | 1,175 | 2,780 | 885 |
| W | 90 | | no cure | | | |
| X | 90 | 196 | 470 | | 1,656 | 3,140 | 810 |

The scorch time as determined by the Mooney Plastometer employing the large rotor at 121° C. for stock X was found to be 24 minutes.

In place of diphenyl guanidine in the aforedescribed gum stocks other basic di-arylene guanidines such as di-o-tolyl guanidine, di-o-ethylphenyl guanidine and the like in admixture with the new vulcanization accelerator adjuvants of this invention provide similar processing safety in the compounding of sulfur-vulcanizable rubbers.

By the term "sulfur-vulcanizable rubbers" as employed in the specification and appended claims is meant to include natural as well as synthetic rubbers which are capable of vulcanization when heated with sulfur and includes latices and reclaims of such materials whether or not admixed with pigments, fillers, softeners, antioxidants, etc.

By the term "vulcanization accelerator" as employed in the specification and appended claims is meant the various well-known chemicals employed for accelerating or catalyzing the sulfur-cure of a vulcanizable rubber whether natural or synthetic and it is to be understood that said term includes the inorganic accelerators such as lead oxide and the organic accelerators such as the aromatic and non-aromatic thiazole sulfides, the thiazolesulfenamides, and the other thiazole vulcanization accelerators, the various dithiocarbamates, the thiuram mono- and disulfides, the aldehydeamine accelerators, the various basic di-arylene guanidine accelerators and the like. A vulcanization accelerator mixture of a tetraalkyl thiuram sulfide, such as tetramethyl thiuram monosulffide, and a 1,2-bis(thiazolyl mercaptomethyl)urea, such as 1,2-bis(2-benzothiazolyl mercaptomethyl)urea, supplemented by the new vulcanization accelerator adjuvant of this invention provides for a highly useful composite in the compounding of sulfur-vulcanizable rubbers for mechanical goods, especially from the standpoint of processing safety, and represents a particularly preferred embodiment of this invention.

While certain embodiments of this invention have been described in detail it is to be understood that this invention is not so limited but that variations and modifications obvious to those skilled in the art, as for example substituting materials having equivalent chemical properties and varying the proportion of the new vulcanization accelerator adjuvants with respect to the vulcanization accelerator may be made depending upon the type of vulcanization accelerator employed, the type of sulfur-vulcanizable rubber, the designs of the rubber compounder, etc., without departing from the spirit or scope of the invention.

What is claimed is:

1. The method of vulcanizing a sulfur-vulcanizable rubber which comprises heating a sulfur-vulcanizable hydrocarbon rubber, sulfur, and a mixture of different accelerators one of which is 0.1–4.0 parts by weight based on the rubber hydrocarbon of a compound selected from the group consisting of a mercaptan and its salts, said mercaptan having the structure

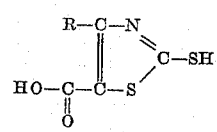

where R is an alkyl radical the other accelerating component being employed in a proportion within the range of 0.1–2.0 parts by weight of the rubber hydrocarbon.

2. The method of vulcanizing a sulfur-vulcanizable rubber which comprises heating a sulfur-vulcanizable hydrocarbon rubber, sulfur, and a mixture of different organic accelerators one of which is 0.1–4.0 parts by weight based on the rubber hydrocarbon of a 2-mercapto-4-alkyl-thiazole-5-carboxylic acid the other accelerating component being employed in a proportion within the range of 0.1-2.0 parts by weight of the rubber hydrocarbon.

3. The method of vulcanizing a sulfur-vulcanizable rubber which comprises heating a sulfur-vulcanizable hydrocarbon rubber, sulfur, furnace carbon black, and a mixture of different organic accelerators one of which is 0.1-4.0 parts by weight based on the rubber hydrocarbon of a 2-mercapto-4-alkyl-thiazole-5-carboxylic acid the other accelerating component being employed in a proportion within the range of 0.1-2.0 parts by weight of the rubber hydrocarbon.

4. The method of vulcanizing natural rubber which comprises heating natural rubber, sulfur, and a mixture of different organic accelerators one of which is 0.1-4.0 parts by weight based on the rubber hydrocarbon of 2-mercapto-4-methyl-thiazole-5-carboxylic acid the other accelerating component being employed in a proportion within the range of 0.1-2.0 parts by weight of the rubber hydrocarbon.

5. The method of vulcanizing natural rubber which comprises heating natural rubber, sulfur, 0.1-0.6 part by weight of the rubber hydrocarbon of a di-aryl guanidine vulcanization accelerator and 0.1-0.7 part by weight of the rubber hydrocarbon of 2-mercapto-4-methylthiazole-5-carboxylic acid.

6. The method of vulcanizing natural rubber which comprises heating natural rubber, sulfur, a vulcanization accelerator mixture of 0.05-0.1 part by weight of the rubber of a tetraalkyl thiuram sulfide and 0.1-0.2 part by weight of the rubber hydrocarbon of a 1,2-bis(thiazolyl mercaptomethyl)urea, and 0.4-0.5 part by weight of the rubber hydrocarbon of 2-mercapto-4-methyl-thiazole-5-carboxylic acid.

7. The method of vulcanizing natural rubber which comprises heating natural rubber, sulfur, 0.1-0.6 part by weight of the rubber hydrocarbon of diphenyl guanidine, and 0.1-0.7 part by weight of the rubber hydrocarbon of 2-mercapto-4-methyl-thiazole-5-carboxylic acid.

8. The method of vulcanizing natural rubber which comprises heating natural rubber, sulfur, a vulcanization accelerator mixture of 0.05-0.1 part by weight of the rubber of tetramethyl thiuram monosulfide and 0.1-0.2 part by weight of the rubber hydrocarbon of 1,2-bis(benzothiazolyl mercaptomethyl)urea, and 0.4-0.5 part by weight of the rubber hydrocarbon of 2-mercapto-4-methyl-thiazole-5-carboxylic acid.

References Cited in the file of this patent
UNITED STATES PATENTS

| | | |
|---|---|---|
| 2,342,545 | Jones | Feb. 22, 1944 |
| 2,746,970 | D'Amico | May 22, 1956 |